(12) United States Patent
Marking et al.

(10) Patent No.: US 7,396,490 B2
(45) Date of Patent: Jul. 8, 2008

(54) CE,PR-COACTIVATED CALCIUM PYROPHOSPHATE PHOSPHOR AND LAMP CONTAINING SAME

(75) Inventors: Gregory A. Marking, Sayre, PA (US); Thomas M. Synder, Laceyville, PA (US)

(73) Assignee: Osram Sylvania Inc., Danvers, MA (US)

( * ) Notice: Subject to any disclaimer, the term of this patent is extended or adjusted under 35 U.S.C. 154(b) by 335 days.

(21) Appl. No.: 11/278,820

(22) Filed: Apr. 6, 2006

(65) Prior Publication Data

US 2007/0235689 A1    Oct. 11, 2007

(51) Int. Cl.
*C09K 11/71*    (2006.01)

(52) U.S. Cl. .............................. 252/301.4 P; 313/486; 313/639

(58) Field of Classification Search ........... 252/301.4 P; 313/486, 639
See application file for complete search history.

(56) References Cited

U.S. PATENT DOCUMENTS

| | | | |
|---|---|---|---|
| 3,882,041 A | 5/1975 | Royce |
| 4,757,233 A | 7/1988 | Peters et al. |
| 6,398,970 B1 | 6/2002 | Juestel et al. |
| 6,734,631 B2 | 5/2004 | Juestel et al. |

*Primary Examiner*—C. Melissa Koslow
(74) *Attorney, Agent, or Firm*—Robert F. Clark

(57) ABSTRACT

A UV-emitting, Ce,Pr-coactivated calcium pyrophosphate phosphor is provided wherein the Pr activator increases the phosphor's sensitivity to excitation by 185 nm radiation. The improved sensitivity to the 185 nm radiation allows the phosphor to make better use of the approximate 10% of the UV radiation that is emitted at 185 nm by a low pressure mercury discharge.

21 Claims, 4 Drawing Sheets

CE,PR-COACTIVATED CALCIUM PYROPHOSPHATE PHOSPHOR AND LAMP CONTAINING SAME

BACKGROUND OF THE INVENTION

The ultraviolet spectrum generally is divided into three regions: UVA (400 nm-320 nm), UVB (320 nm-290 nm) and UVC (290 nm-200 nm). The UVA and UVB regions are important for suntan lamps and medical phototherapy applications and the UVC is important for germicidal lamp applications. The phosphors used in these applications are typically intended for stimulation with the type of low pressure mercury discharge used in conventional fluorescent lamps which generates primarily 254 nm radiation.

U.S. Pat. No. 4,757,233 describes a ultraviolet (UV)-emitting cerium-activated calcium pyrophosphate phosphor. The phosphor formulation is given as $Ca_{(2-w-x-y)}(NSF)_w Ce_x Na_y P_2 O_7$, where NSF is the nonstoichiometric factor, and w ranges from 0 to 0.1, x ranges from 0.05 to 0.20, and y ranges from 0.05 to 0.20. The nonstoichiometric factor is an idea common to many phosphors where a small excess of anionic species is used in the formulated phosphor blend and results in improved brightness for the fired phosphor material. The amount of $Na^+$ in the phosphor formulation is approximately equal to the amount of $Ce^{3+}$ in the phosphor for overall charge balance. The Ce-activated calcium pyrophosphate phosphor is stimulated by 254 nm radiation and has an emission peak in the UVB region at about 330 nm.

SUMMARY OF THE INVENTION

The present invention improves the performance of the cerium-activated calcium pyrophosphate phosphor by incorporating a praseodymium coactivator. The praseodymium coactivator significantly increases the UV emission of the phosphor under excitation by 185 nm radiation while maintaining the phosphor's sensitivity to excitation by 254 nm radiation. This is important because the low-pressure mercury discharge used in suntan lamps not only emits 254 nm radiation but can also emit up to ~10% of the radiation at 185 nm depending upon the fill pressure of the lamp. Thus, the Ce,Pr-coactivated phosphor of the present invention can utilize more of the available excitation radiation of a mercury discharge than the Ce-activated phosphor.

The Ce,Pr-coactivated calcium pyrophosphate phosphor of this invention may be represented by the general formula $Ca_2 P_2 O_7$:Ce,Pr. The phosphor emits ultraviolet radiation at about 334 nm in response to stimulation by 254 nm and 185 nm radiation. Preferably, the phosphor also contains sodium in an amount up to about 0.25 moles Na per mole of phosphor.

In a preferred embodiment, the phosphor may be represented by the formula, $Ca_{(2-w-x-y-z)} Ce_x A_y Pr_z P_2 O_7$, where: A is a 1+ metal cation, preferably $Na^+$; w is a nonstoichiometric factor which ranges from 0 to about 0.1 and is more preferably equal to about 0.06; x ranges from about 0.04 to about 0.16 and more preferably about 0.07 to about 0.12; y ranges from 0 to about 0.25 and more preferably x+z−0.01 to x+z+0.01; and z ranges from greater than 0 to about 0.06 and more preferably greater than 0 to about 0.04. The 1+ metal cation is included in the formulation primarily for charge balancing. It is therefore preferred that the amount of the 1+ metal cation equal the sum of the amounts of the Pr and Ce activators, i.e., y=x+z.

DETAILED DESCRIPTION OF THE INVENTION

Figure 1:
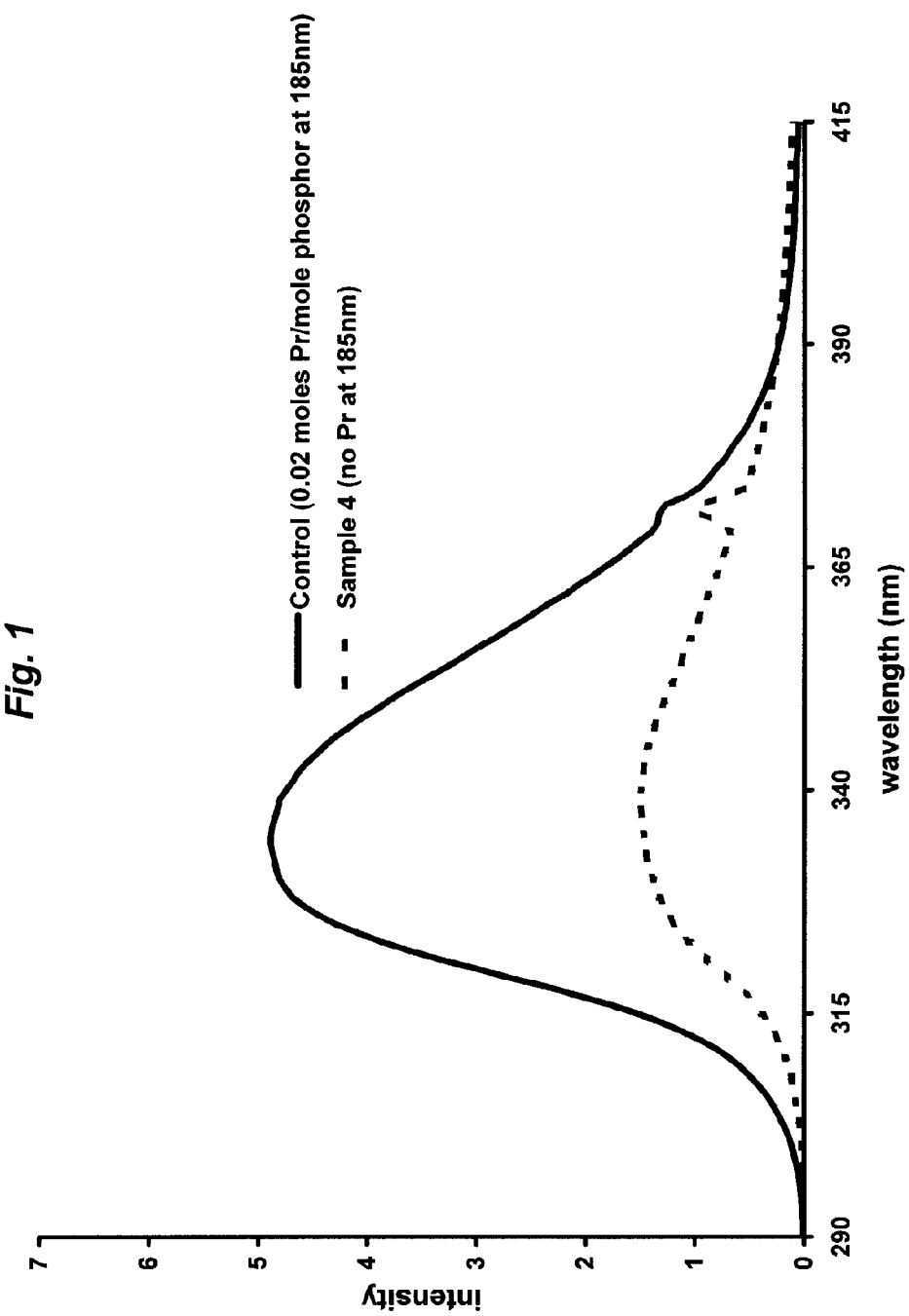
FIG. 1 is a graph of the UV emission of the phosphor of this invention (control) under 185 nm excitation compared with the emission of a Ce-activated calcium pyrophosphate phosphor (sample 4) having the same level of Ce activator.

For a better understanding of the present invention, together with other and further objects, advantages and capabilities thereof, reference is made to the following disclosure and appended claims taken in conjunction with the above-described drawings.

The $Ca_2 P_2 O_7$:Ce,Pr phosphor of this invention may be prepared by thoroughly dry blending the appropriate raw materials, then firing the blended material in a reducing atmosphere, e.g., 5% $H_2$-95% $N_2$, for a time and at a temperature sufficient to form the phosphor, preferably 2-4 hours at 1000° C. In a preferred embodiment, the raw materials include calcium hydrogen phosphate, $CaHPO_4$, diammonium hydrogen phosphate, $(NH_4)_2 HPO_4$, sodium carbonate, $Na_2 CO_3$, cerium oxide, $CeO_2$, and praseodymium oxide, $Pr_4 O_7$.

After firing the raw materials, the fired cakes can be softened by soaking for 2-12 hours in de-ionized water and then wet-sieved −60 mesh and dried. Alternatively, the dry fired cakes can be broken into smaller pieces, ground, and dry sifted −60 mesh. Wet ball milling is then used to reach the appropriate particle size in order to minimize loss of brightness due to particle damage.

EXAMPLES

Samples of $Ca_2 P_2 O_7$:Ce and $Ca_2 P_2 O_7$:Ce,Pr phosphors were prepared as follows:

To make the $Ca_2 P_2 O_7$:Ce phosphor sample, 2.337 kg of $CaHPO_4$, 397.7 grams of $(NH_4)_2 HPO_4$, 206.5 grams of $CeO_2$, and 63.6 grams of $Na_2 CO_3$ were combined and blended.

To make the $Ca_2 P_2 O_7$:Ce,Pr phosphor sample, 2.337 kg of $CaHPO_4$, 397.7 grams of $(NH_4)_2 HPO_4$, 172.1 grams of $CeO_2$, 63.6 grams of $Na_2 CO_3$, and 33.8 grams $Pr4O7$ were combined and blended.

In both cases, the blended materials were loaded into silica crucibles and fired for 2 hours at 1000° C. under a 5% $H_2$-95% $N_2$ atmosphere. The samples were then broken apart, ground for 3 minutes, sieved −60 mesh, lightly wet milled for 3.5-4.0 hours, dried and sieved −300 mesh. The UV emission spectra of the two phosphors was measured under 254 nm excitation. The relative intensities of the UV emissions in the range from 270 nm to 400 nm are compared in Table 1. The data show that under 254 nm excitation the UV emission of the $Ca_2 P_2 O_7$:Ce,Pr phosphor was greater than the $Ca_2 P_2 O_7$:Ce phosphor even though the $Ca_2 P_2 O_7$:Ce,Pr phosphor contained less of the cerium activator.

TABLE 1

| | 254 nm excitation | |
|---|---|---|
| | Sample | |
| | $Ca_2P_2O_7$:Ce | $Ca_2P_2O_7$:Ce,Pr |
| Peak Wavelength | 334 nm | 334 nm |
| UVB/UVA ratio | 4.4% | 4.2% |
| Relative Peak Intensity | 100% | 106% |
| Relative Integrated Intensity (270-400 nm) | 100% | 103% |

A series of samples were then prepared to optimize the phosphor formulation for excitation under 254 nm and 185 nm radiation. These samples were fired under the same conditions as the Table 1 samples, then ground and sifted −60 mesh, but not milled. In each case, the nonstoichiometric factor, w, was 0.06 and the Na level was kept equal to the total activator level, i.e., y=x+z.

Table 2 lists the relative molar amounts of raw materials, activator levels (moles of activator/mole of phosphor) and UV emission results between 290 and 415 nm for these samples, including integrated emission intensities (relative brightness) under 254 nm and 185 nm radiation. UV emission spectra were obtained using an Acton SpectraPro-2500i monochromator/spectrograph with a deuterium light source and a VM-504 vacuum monochromator. A calculated total brightness is provided based on a 10% excitation by 185 nm and 90% excitation by 254 nm radiation in order to simulate performance under a low-pressure mercury discharge. Sample 1 was used as the Control and its relative brightness under 254 nm radiation was set at 100%.

TABLE 2

$Ca_{(1.94-x-y-z)}Ce_xNa_yPr_zP_2O_7$

| | Sample 1 (Control) | Sample 2 | Sample 3 | Sample 4 | Sample 5 | Sample 6 | Sample 7 | Sample 8 |
|---|---|---|---|---|---|---|---|---|
| $CaHPO_4$ | 1.70 | 1.70 | 1.66 | 1.74 | 1.70 | 1.66 | 1.74 | 1.70 |
| $(NH_4)_2HPO_4$ | 0.30 | 0.30 | 0.34 | 0.26 | 0.30 | 0.34 | 0.26 | 0.30 |
| $CeO_2$ | 0.10 | 0.12 | 0.12 | 0.10 | 0.11 | 0.11 | 0.09 | 0.09 |
| $Na_2CO_3$ | 0.06 | 0.06 | 0.07 | 0.05 | 0.06 | 0.07 | 0.05 | 0.06 |
| $Pr_4O_7$ | 0.005 | 0 | 0.005 | 0 | 0.0025 | 0.0075 | 0.0025 | 0.0075 |
| Ce level (x) | 0.10 | 0.12 | 0.12 | 0.10 | 0.11 | 0.11 | 0.09 | 0.09 |
| Pr level (y) | 0.02 | 0 | 0.02 | 0 | 0.01 | 0.03 | 0.01 | 0.03 |
| 254 nm Rel. Brightness | 100% | 102% | 98% | 101% | 102% | 99% | 105% | 102% |
| 185 nm Rel. Brightness | 74% | 32% | 70% | 26% | 65% | 76% | 68% | 81% |
| Calculated Total Brightness | 97% | 95% | 96% | 94% | 98% | 97% | 101% | 100% |

FIG. 1 compares the UV emission spectrum of the Control sample under 185 nm excitation with that of sample 4. Both phosphors contained 0.10 moles Ce/mole of phosphor. However, the control sample additionally contained 0.02 moles Pr/mole of phosphor. The additional Pr coactivator clearly increases the sensitivity of the phosphor to 185 nm radiation resulting in a significant increase in its UV emission. This can also be seen in Table 1, where the real brightness under 185 nm radiation was 74% for the Ce,Pr-coactivated control sample and only 26% for the Ce-only activated sample 4. Moreover, the data shows that the UV emission under 254 nm excitation was nearly identical for both samples. A similar behavior can be observed for samples 2 and 3. In fact, all of the Ce,Pr-coactivated phosphors were observed to exhibit greater UV emission intensity under 185 nm excitation.

Another further series of samples was made. Again the amount of $Na^+$ was kept equal to the sum of the $Ce^{3+}$ and $Pr^{3+}$ co-activators and the nonstoichiometric factor, w, was 0.06. The samples were fired, processed, and analyzed in approximately the same fashion as the Table 2 samples. Tables 3a and 3b list the relative molar amounts of raw materials, activator levels (moles of activator/mole of phosphor) and UV emission results for these samples referenced to the Control in Table 2.

TABLE 3a $Ca_{(1.94-x-y-z)}Ce_xNa_yPr_zP_2O_7$

| | Sample 9 | Sample 10 | Sample 11 | Sample 12 | Sample 13 |
|---|---|---|---|---|---|
| $CaHPO_4$ | 1.72 | 1.68 | 1.72 | 1.68 | 1.72 |
| $(NH_4)_2HPO_4$ | 0.28 | 0.32 | 0.28 | 0.32 | 0.28 |
| $CeO_2$ | 0.09 | 0.09 | 0.08 | 0.10 | 0.10 |
| $Na_2CO_3$ | 0.055 | 0.065 | 0.055 | 0.065 | 0.055 |
| $Pr_4O_7$ | 0.005 | 0.01 | 0.0075 | 0.0075 | 0.0025 |
| Ce level (x) | 0.09 | 0.09 | 0.08 | 0.10 | 0.10 |
| Pr level (y) | 0.02 | 0.04 | 0.03 | 0.03 | 0.01 |
| 254 nm Rel. Brightness | 102% | 99% | 101% | 99% | 101% |
| 185 nm Rel. Brightness | 75% | 82% | 81% | 78% | 63% |
| Calculated Total Brightness | 99% | 97% | 100% | 98% | 98% |

TABLE 3b $Ca_{(1.94-x-y-z)}Ce_xNa_yPr_zP_2O_7$

| | Sample 14 | Sample 15 | Sample 16 | Sample 17 |
|---|---|---|---|---|
| $CaHPO_4$ | 1.68 | 1.76 | 1.76 | 1.76 |
| $(NH_4)_2HPO_4$ | 0.32 | 0.24 | 0.24 | 0.24 |
| $CeO_2$ | 0.11 | 0.07 | 0.09 | 0.08 |
| $Na_2CO_3$ | 0.065 | 0.045 | 0.045 | 0.045 |
| $Pr_4O_7$ | 0.005 | 0.005 | 0 | 0.0025 |
| Ce level (x) | 0.11 | 0.07 | 0.09 | 0.08 |
| Pr level (y) | 0.02 | 0.02 | 0 | 0.01 |
| 254 nm Rel. Brightness | 100% | 101% | 103% | 102% |

TABLE 3b-continued $Ca_{(1.94-x-y-z)}Ce_xNa_yPr_zP_2O_7$

| | Sample 14 | Sample 15 | Sample 16 | Sample 17 |
|---|---|---|---|---|
| 185 nm Rel. Brightness | 72% | 76% | 24% | 66% |
| Calculated Total Brightness | 98% | 99% | 97% | 99% |

The data in the above tables demonstrates that the Pr coactivator significantly increases the sensitivity of the phosphor to excitation by 185 nm radiation with only a minor effect on the sensitivity to excitation by 254 nm radiation. The overall effect therefore is that an increased emission should result from the Ce,Pr-coactivated phosphor when irradiated by a low pressure mercury discharge. The calculated total brightness, which predicts the performance of the phosphor in a low-pressure mercury discharge, was in most cases greater for the coactivated phosphors than the calculated total brightness for the phosphors that were only activated with Ce.

Figure 2:
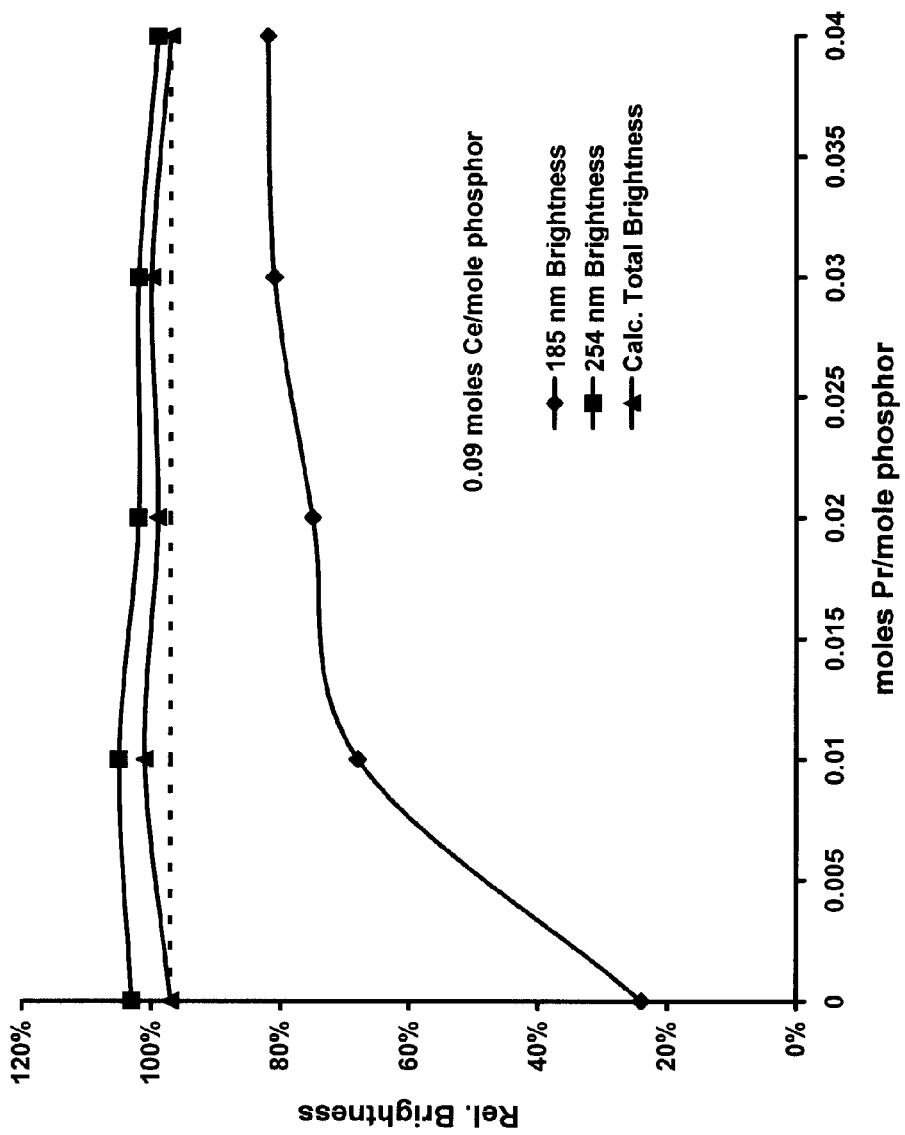
FIG. 2 is a graph of the relative brightness of the phosphor of this invention as a function of the Pr activator level and excitation wavelength at a fixed Ce activator level of 0.09 moles Ce/mole phosphor.
Figure 3:
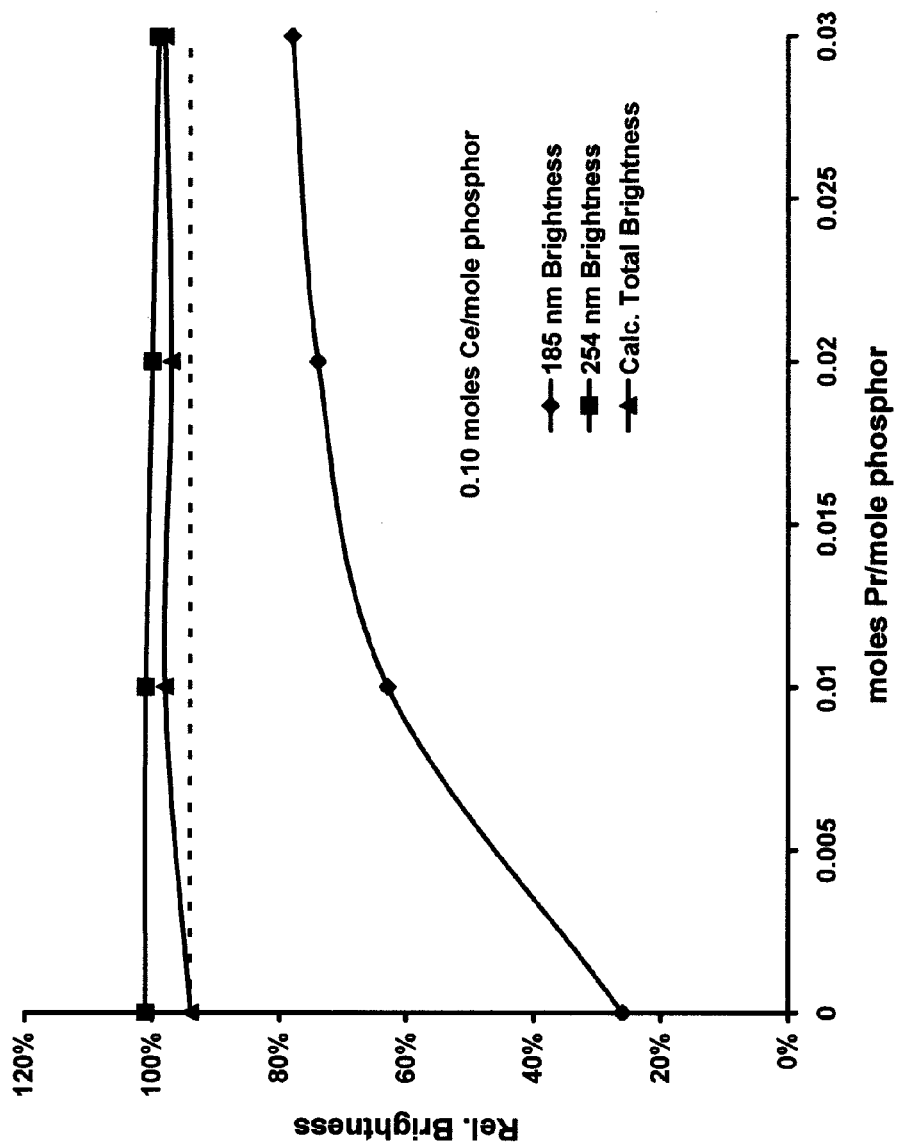
FIG. 3 is a graph of the relative brightness of the phosphor of this invention as a function of the Pr activator level and excitation wavelength at a fixed Ce activator level of 0.10 moles Ce/mole phosphor.

This can be better seen in FIGS. 2 and 3 which plot the different brightness levels as a function of the amount of the Pr activator. The series of samples shown in FIG. 2 all contained 0.09 moles Ce/mole phosphor. The series of samples shown in FIG. 3 all contained 0.10 moles Ce/mole phosphor. The dotted line in each figure represents the calculated total brightness level for the phosphor containing only the Ce activator. The figures show that for almost all of the Ce,Pr-coactivated samples the calculated total brightness level was greater than the level for the Ce-only phosphor.

Figure 4:
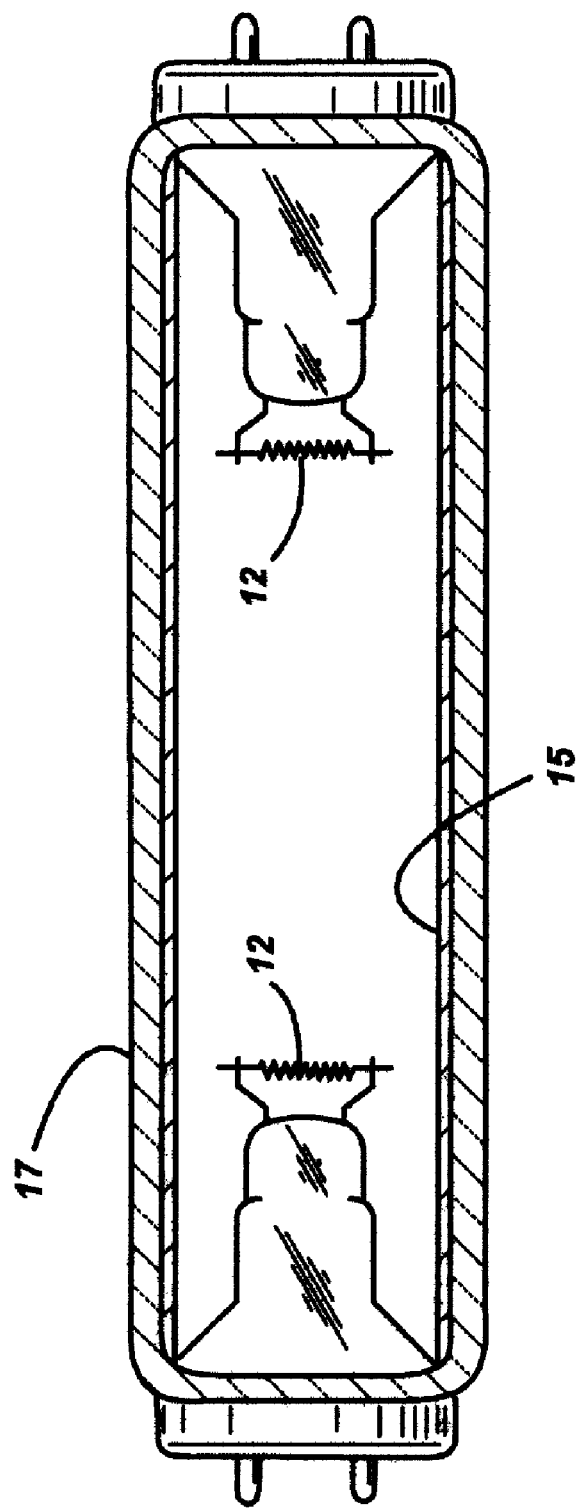
FIG. 4 is a cross-sectional illustration of a fluorescent lamp having a phosphor coating containing the $Ca_2 P_2 O_7$:Ce,Pr phosphor.

FIG. 4 is a cross-sectional illustration of a fluorescent lamp having a phosphor coating containing the $Ca_2P_2O_7$:Ce,Pr phosphor. The lamp has a hermetically sealed glass envelope 17. The interior of the envelope 17 is filled with an inert gas such as argon or a mixture of argon and krypton at a low pressure, for example 1-3 torr, and a small quantity of mercury, at least enough to provide a low vapor pressure (roughly 0.008 torr at 40° C.) during operation. An electrical discharge is generated between electrodes 12 to excite the mercury vapor to generate ultraviolet radiation. A phosphor coating 15 is applied to the interior surface of the envelope 17 to convert at least a portion of the ultraviolet radiation emitted by the low-pressure mercury discharge into a desired wavelength range. The phosphor coating 15 contains the $Ca_2P_2O_7$:Ce,Pr phosphor which is stimulated by the ultraviolet radiation emitted by the discharge to emit ultraviolet radiation at about 334 nm.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A UV-emitting phosphor comprising calcium pyrophosphate activated with cerium and praseodymium.

2. The phosphor of claim 1 wherein the phosphor is represented by a formula $Ca_{(2-w-x-y-z)}Ce_xA_yPr_zP_2O_7$, where: A is a 1+ metal cation; w ranges from 0 to about 0.1; x ranges from about 0.04 to about 0.16; y ranges from 0 to about 0.25; and z ranges from greater than 0 to about 0.06.

3. The phosphor of claim 2 wherein y ranges from x+z−0.01 to x+z+0.01.

4. The phosphor of claim 2 wherein y=x+z.

5. The phosphor of claim 1 wherein the phosphor contains sodium in an amount up to about 0.25 moles Na per mole of phosphor.

6. The phosphor of claim 2 wherein A is $Na^+$.

7. The phosphor of claim 6 wherein y ranges from x+z−0.01 to x+z+0.01.

8. The phosphor of claim 2 wherein x ranges from about 0.07 to about 0.12.

9. The phosphor of claim 2 wherein z ranges from greater than 0 to about 0.04.

10. The phosphor of claim 2 wherein w is equal to about 0.06.

11. The phosphor of claim 1 wherein the phosphor is represented by a formula $Ca_{(2-w-x-y-z)}Ce_xNa_yPr_zP_2O_7$, where: w ranges from 0 to about 0.1; x ranges from about 0.04 to about 0.16; y ranges from 0 to about 0.25; and z ranges from greater than 0 to about 0.06.

12. The phosphor of claim 11 wherein y ranges from x+z−0.01 to x+z+0.01.

13. The phosphor of claim 12 wherein x ranges from about 0.07 to about 0.12.

14. The phosphor of claim 12 wherein z ranges from greater than 0 to about 0.04.

15. The phosphor of claim 12 wherein w is equal to about 0.06.

16. The phosphor of claim 11 wherein x ranges from about 0.07 to about 0.12 and z ranges from greater than 0 to about 0.04.

17. The phosphor of claim 16 wherein y ranges from x+z−0.01 to x+z+0.01.

18. The phosphor of claim 16 wherein y=x+z.

19. A lamp comprising a glass envelope having a phosphor coating on an interior surface, the phosphor coating containing a UV-emitting phosphor comprising calcium pyrophosphate activated with cerium and praseodymium.

20. The lamp of claim 19 wherein the phosphor is represented by a formula $Ca_{(2-w-x-y-z)}Ce_xA_yPr_zP_2O_7$, where: A is a 1+ metal cation; w ranges from 0 to about 0.1; x ranges from about 0.04 to about 0.16; y ranges from 0 to about 0.25; and z ranges from greater than 0 to about 0.06.

21. A lamp comprising a glass envelope having a phosphor coating on an interior surface, the envelope being hermetically sealed and containing an amount of mercury and an inert gas, and the phosphor coating containing a UV-emitting $Ca_2P_2O_7$:Ce,Pr phosphor.

* * * * *